US012789931B2

(12) United States Patent
Sugimoto et al.

(10) Patent No.: US 12,789,931 B2
(45) Date of Patent: Nov. 10, 2026

(54) SADDLE-RIDDEN VEHICLE

(71) Applicant: HONDA MOTOR CO., LTD., Tokyo (JP)

(72) Inventors: Koichiro Sugimoto, Tokyo (JP); Yosuke Tsuchiya, Tokyo (JP); Yusuke Kimura, Tokyo (JP); Toya Tsukagoshi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 19/164,979

(22) PCT Filed: Dec. 27, 2023

(86) PCT No.: PCT/JP2023/046912
§ 371 (c)(1),
(2) Date: Sep. 12, 2025

(87) PCT Pub. No.: WO2024/202350
PCT Pub. Date: Oct. 3, 2024

(65) Prior Publication Data

US 2026/0242020 A1 Aug. 20, 2026

(30) Foreign Application Priority Data

Mar. 31, 2023 (JP) ................................. 2023-059391

(51) Int. Cl.
*B62J 6/023* (2020.01)
*B62J 6/05* (2020.01)
(Continued)

(52) U.S. Cl.
CPC ............. *B62J 6/023* (2020.02); *B62J 45/412* (2020.02); *B62J 45/4151* (2020.02); *B62J 6/05* (2020.02)

(58) Field of Classification Search
CPC ....... B62J 6/00; B62J 6/023; B62J 6/04; B62J 6/05
See application file for complete search history.

(56) References Cited

U.S. PATENT DOCUMENTS 4,024,388 A * 5/1977 Skoff ....................... B62J 6/023 362/475
11,407,463 B2 * 8/2022 Muramatsu .......... B60Q 1/0041
(Continued)

FOREIGN PATENT DOCUMENTS

EP 2669163 A1 * 12/2013 ............... B60Q 1/18
EP 2676839 A1 * 12/2013 ........... B60Q 1/1423
(Continued)

OTHER PUBLICATIONS

International Search Report Corresponding to International Application No. PCT/JP2023/046912, dated Mar. 5, 2024, 6 pages.
(Continued)

*Primary Examiner* — Alexander K Garlen
(74) *Attorney, Agent, or Firm* — Rankin, Hill & Clark LLP

(57) ABSTRACT

To allow others outside a saddle-ride vehicle to easily recognize the saddle-ride vehicle when the vehicle is tilted to left or right. In a saddle-ride vehicle including a lighting device (45), the lighting device (45) emits predetermined light (LA) capable of providing a higher brightness than headlight light and taillight light at a predetermined position spaced away from the vehicle, and an irradiation direction with the predetermined light (LA) is at least one of a direction toward the side at the front of the vehicle, a direction toward the side at the rear of the vehicle, and a direction toward the side of the vehicle, and at least one of an upward direction and a downward direction when the vehicle stands upright.

8 Claims, 10 Drawing Sheets

(51) Int. Cl.
*B62J 45/412* (2020.01)
*B62J 45/415* (2020.01)

(56) References Cited

U.S. PATENT DOCUMENTS

| | | | | |
|---|---|---|---|---|
| 2013/0241413 | A1* | 9/2013 | Ooba | B60Q 1/12 315/82 |
| 2013/0241414 | A1* | 9/2013 | Ikeda | B62J 6/023 315/82 |
| 2017/0101147 | A1* | 4/2017 | Hasegawa | B60Q 1/346 |
| 2018/0148116 | A1 | 5/2018 | Kurata | |
| 2019/0337444 | A1 | 11/2019 | Santucci et al. | |
| 2020/0017164 | A1* | 1/2020 | Saeki | B60Q 1/0023 |
| 2020/0307731 | A1* | 10/2020 | Neuman | B62J 6/26 |
| 2021/0078484 | A1 | 3/2021 | Fujii et al. | |
| 2023/0311742 | A1* | 10/2023 | Sekine | B62J 6/023 |
| 2024/0367742 | A1* | 11/2024 | Sanz Espinosa | B60Q 1/50 |

FOREIGN PATENT DOCUMENTS

| | | | |
|---|---|---|---|
| JP | 2010-111132 | A | 5/2010 |
| JP | 3203408 | U | 3/2016 |
| JP | 2017-74820 | A | 4/2017 |
| JP | 2018-90001 | A | 6/2018 |
| JP | 2019-524531 | A | 9/2019 |
| JP | 2022-126739 | A | 8/2022 |
| KR | 10-2016-0106852 | A | 9/2016 |
| WO | 2017/051558 | A1 | 3/2017 |
| WO | 2019/187427 | A1 | 10/2019 |

OTHER PUBLICATIONS

International Preliminary Report on Patentability Corresponding to International Application No. PCT/JP2023/046912, dated Sep. 4, 2024, 7 pages.

English translation of the International Preliminary Report on Patentability dated Oct. 2, 2025 issued in corresponding International application No. PCT/JP2023/046912; 4 pages.

* cited by examiner

SADDLE-RIDDEN VEHICLE

TECHNICAL FIELD

The present invention relates to a saddle-ride vehicle.

BACKGROUND ART

Some vehicles are equipped, in a headlight unit, with an auxiliary lamp that illuminates a region other than an illumination region of a headlight. For example, in a vehicle described in Patent Literature 1, a large deflection lamp, a middle deflection lamp and a large diffusion lamp are arranged in this order from the center of the vehicle to outside, and the large diffusion lamp is configured to illuminate a region in the vicinity of an own vehicle laterally from front to sides and further to rear, so that a driver can easily check pedestrians, bicycles and the like present in the vicinity of the vehicle.

CITATION LIST

Patent Literature

Patent Literature 1: Japanese Patent Laid-Open No. 2010-111132

SUMMARY OF INVENTION

Technical Problem

However, a main object of such a conventional configuration is for a driver to check a pedestrian, a bicycle, and the like and the main object is not for a driver of another vehicle or the pedestrian to easily notice the vehicle.

An object of the present invention, which has been made in view of the above-described circumstances, is to allow others outside a saddle-ride vehicle to easily recognize the saddle-ride vehicle when the vehicle is tilted to the left or right.

Solution to Problem

This description includes all contents of Japanese Patent Application No. 2023-059391 filed on Mar. 31, 2023.

In a saddle-ride vehicle including a lighting device, the lighting device emits predetermined light capable of providing a higher brightness than headlight light and taillight light at a predetermined position spaced away from the vehicle, and an irradiation direction with the predetermined light is at least one of a direction toward the side at the front of the vehicle, a direction toward the side at the rear of the vehicle, and a direction toward the side of the vehicle, and at least one of an upward direction and a downward direction when the vehicle stands upright.

Advantageous Effect of Invention

When a saddle-ride vehicle is tilted to the left or right, the saddle-ride vehicle can be easily recognized by others outside the vehicle.

DESCRIPTION OF EMBODIMENT

Figure 1:
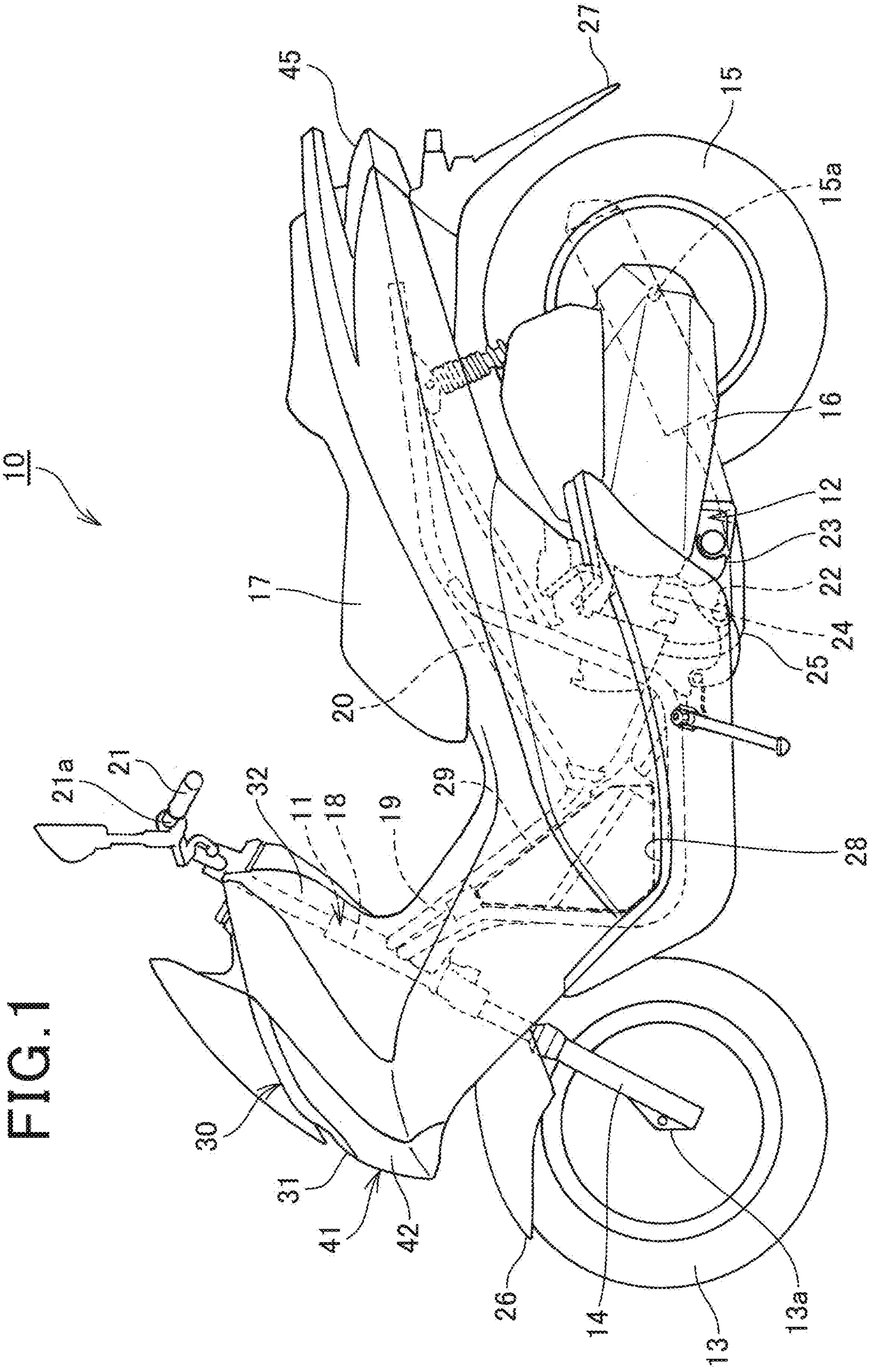
FIG. 1 shows a side view of a saddle-ride vehicle according to an embodiment of the present invention.

An embodiment of the present invention will be described below with reference to the drawings. Unless otherwise mentioned, directions including front-rear, left-right, and up-down mentioned in the description are the same as those directions relative to a vehicle body. Reference signs FR, UP, and LH shown in the drawings indicate a vehicle body front side, a vehicle body upper side, and a vehicle body left side, respectively.

Embodiment

FIG. 1 is a side view of a saddle-ride vehicle 10 according to an embodiment of the present invention.

The saddle-ride vehicle 10 is a vehicle including a vehicle body frame 11, a power unit 12 supported on the vehicle body frame 11, a front fork 14 that supports a front wheel 13 in a steerable manner, a swing arm 16 that supports a rear wheel 15, and a seat 17 for a rider.

The saddle-ride vehicle 10 is a vehicle on which the rider sits astride the seat 17. The seat 17 is provided above a rear part of the vehicle body frame 11.

The vehicle body frame 11 includes a head pipe 18 provided at a front end portion of the vehicle body frame 11, a front frame 19 located on a rear side of the head pipe 18, and a rear frame 20 located on a rear side of the front frame 19. A front end portion of the front frame 19 is connected to the head pipe 18.

The seat 17 is supported on the rear frame 20.

The front fork 14 is supported on the head pipe 18 in such a manner that it can be steered left and right. The front wheel 13 is supported on an axle **13*a* provided at a lower end portion of the front fork 14. A handle 21 for steering that the rider grasps is mounted at an upper end portion of the front fork 14**.

The swing arm 16 is supported on a pivot shaft 22 that is supported on the vehicle body frame 11. The pivot shaft 22 is a shaft extending horizontally in a vehicle width direction. The pivot shaft 22 is passed through a front end portion of the swing arm 16. The swing arm 16 swings up and down around the pivot shaft 22.

The rear wheel 15 is supported on an axle **15*a* provided at a rear end portion of the swing arm 16**.

The power unit 12 is disposed between the front wheel 13 and the rear wheel 15 and supported on the vehicle body frame 11.

The power unit 12 is an internal combustion engine. The power unit 12 includes a crankcase 23 and a cylinder 24 that houses a reciprocating piston. An exhaust device 25 is connected to an exhaust port of the cylinder 24.

An output of the power unit 12 is transmitted to the rear wheel 15 through a drive power transmission member that connects the power unit 12 and the rear wheel 15 to each other.

The saddle-ride vehicle 10 further includes a front fender 26 that covers the front wheel 13 from above, a rear fender 27 that covers the rear wheel 15 from above, footrests 28 on which the rider places his or her feet, and a fuel tank 29 that stores fuel to be used by the power unit 12.

The front fender 26 is mounted on the front fork 14. The rear fender 27 and the footrests 28 are provided on a lower side relative to the seat 17. The fuel tank 29 is supported on the vehicle body frame 11.

The saddle-ride vehicle 10 includes a vehicle body cover 30 that covers the vehicle body. The vehicle body cover 30 includes a front cover 31 that covers a front part of the vehicle body from front and left and right sides, and an inner cover 32 that covers the front frame 19 from above. The front cover 31 has a cover shape that expands in a vehicle width direction and up-down direction as being rearward and is formed in a symmetrical shape with respect to a vehicle width center. A light unit 41 that emits headlight light is attached to the front cover 31. The headlight light comprises a low beam (so-called passing headlight) and a high beam (so-called traveling headlight). Furthermore, a rear light unit 45 that emits taillight light is attached to a rear part of the saddle-ride vehicle 10. The taillight light is light corresponding to light of a tail lamp or a brake lamp. In addition, the saddle-ride vehicle 10 is not limited to a configuration shown in FIG. 1, and the configuration and shape of each part and the like may be changed.

The light unit 41 is a unit constituting a part of a lighting device of the saddle-ride vehicle 10 and is also referred to as a headlight unit or a front light unit. The light unit 41 is located forward relative to the center of the vehicle body in a front-rear direction in the saddle-ride vehicle 10, and more specifically, is located forward from a steering handlebar 21*a* and the vehicle body frame 11. The light unit 41 may be either a so-called handle mount unit supported on the handle 21 or a so-called frame mount unit supported on the vehicle body frame 11. The light unit 41 has a function of emitting light LA to improve visibility of the saddle-ride vehicle 10 from others outside the vehicle.

The light LA employs light having a small divergence angle such as parallel light or quasi-parallel light and is therefore light capable of providing a higher brightness at a predetermined position spaced part from the saddle-ride vehicle 10 than generally diffusion light such as headlight light, taillight light or turn signal light. The predetermined position is a position in a direction in which the light LA is emitted and may be a position farther than the headlight light, the taillight light and the turn signal light, or a position away from an irradiation range with the headlight light, taillight light and turn signal light. The predetermined position includes a position of a driver of another vehicle 111 (FIG. 5 and the like) with respect to the saddle-ride vehicle 10 tilted to the left or right, as described later. This light LA is light corresponding to "predetermined light" of the present invention.

As viewed in the vehicle body front-rear direction, an irradiation direction with the light LA is a downward direction when the vehicle stands upright or an upward direction when the vehicle stands upright. Hereinafter, each direction will be described.

It is to be noted that the "downward direction when the vehicle stands upright" may be considered to be a direction outward from the left and right of the vehicle and downward on the vehicle when the vehicle stands upright, and in the present embodiment, the direction may be considered to be a direction downward with respect to a height of a reflector 61*b* (see FIG. 2) described later. Furthermore, it may be considered that the "upward direction when the vehicle stands upright" is a direction outward from the vehicle left and right and above the vehicle when the vehicle stands upright, and in the present embodiment, the direction is a direction upward with respect to the height of the reflector 61*b*. For the convenience of description, in the following description, the light LA is appropriately referred to as "irradiation light LA".

Figure 2:
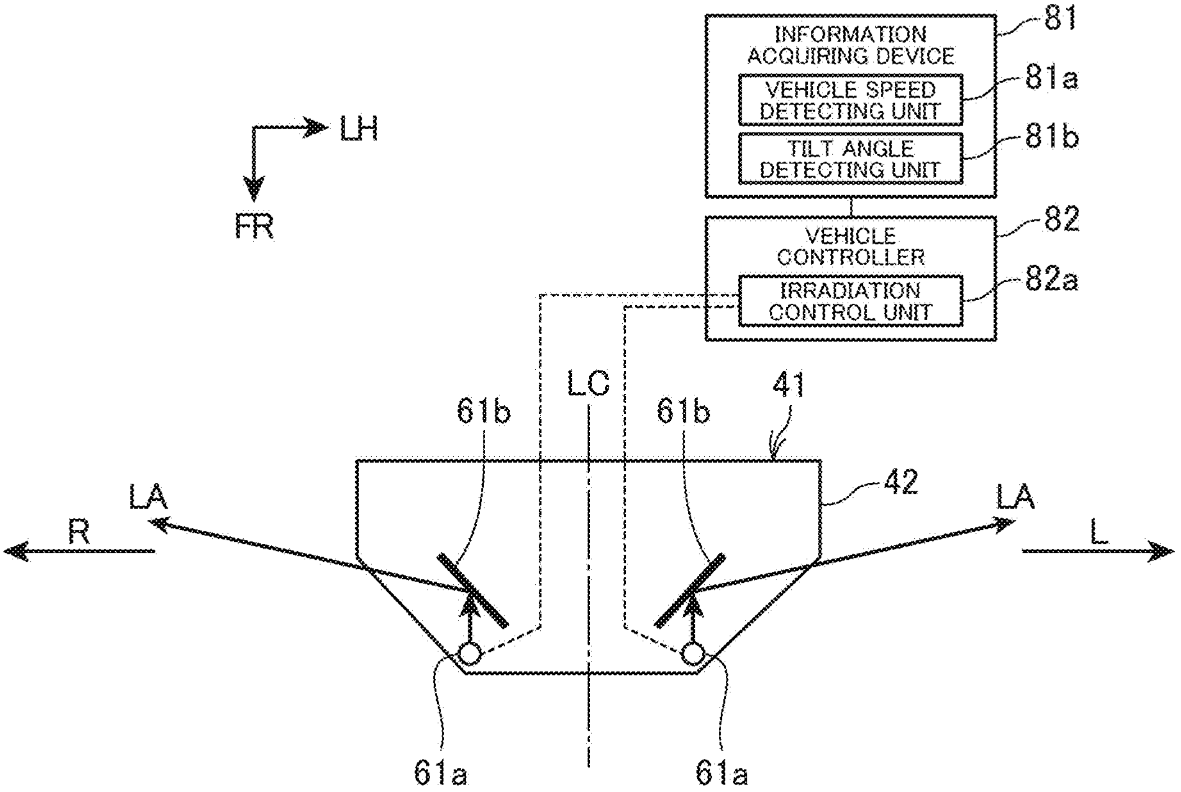
FIG. 2 schematically shows a light unit from above a vehicle body.

Case where the Irradiation Direction with the Light LA is Downward when the Vehicle Stands Upright FIG. 2 is a diagram schematically showing the light unit 41 from above the vehicle. Reference sign LC in FIG. 2 indicates the center of the vehicle width. FIG. 2 also shows a configuration related to irradiation/irradiation stop with the irradiation light LA, and this configuration will be described later.

The light unit 41 includes a housing 42 (also referred to as an enclosure) extending left and right outward with respect to the vehicle width center LC and includes, in the housing 42, a pair of left and right light sources 61*a*, and a pair of left and right reflectors 61*b* that reflect light from each light source 61*a* as the irradiation light LA.

Each light source 61*a* is a known light source such as an LED and emits visible light. The light source 61*a* is not limited to a point light source and may be a planar light source in which a plurality of light emitting elements are densely arranged to radiate planar light. The planar light source is, for example, a Chips on Board (COB) or Surface Mount Device (SMD) LED.

Each reflector 61*b* is formed in a reflecting mirror that emits light from the light source 61*a* in the irradiation direction with the irradiation light LA. In each reflector 61*b*, a reflecting mirror is adopted, in which a region capable of emitting the light LA having a predetermined width in a desired direction is formed on a reflecting surface in a circular paraboloid focusing on the position of the light source 61*a*. Consequently, the reflector 61*b* emits the irradiation light LA comprising parallel light. When the irradiation light LA is designed as parallel light, it is easier to maintain a brightness at or above a certain level higher than a brightness of surrounding light (corresponding to, for example, headlight light, taillight light, turn signal light, or ambient light), and it is easy for others to recognize the irradiation light LA. In addition, a width of the parallel light may be set appropriately.

Furthermore, the irradiation light LA is not limited to parallel light, and may be, for example, quasi-parallel light. The quasi-parallel light is divergent light in a state close to parallel light. The quasi-parallel light has a small divergence angle and can be emitted as the light having the brightness at or above a certain level to a comparatively far distance in the same manner as parallel light. For example, the reflecting surface of each reflector 61*b* may be a reflecting surface that approximates the circular paraboloid.

In the present embodiment, each reflector 61*b* and light source 61*a* are fixed to the light unit 41. Therefore, the irradiation direction with each irradiation light beam LA from the saddle-ride vehicle 10 is fixed.

In the present configuration, as shown in FIG. 2, the reflectors 61*b* direct the irradiation light beams LA toward the left and right, respectively, in a vehicle top view.

Figure 3:
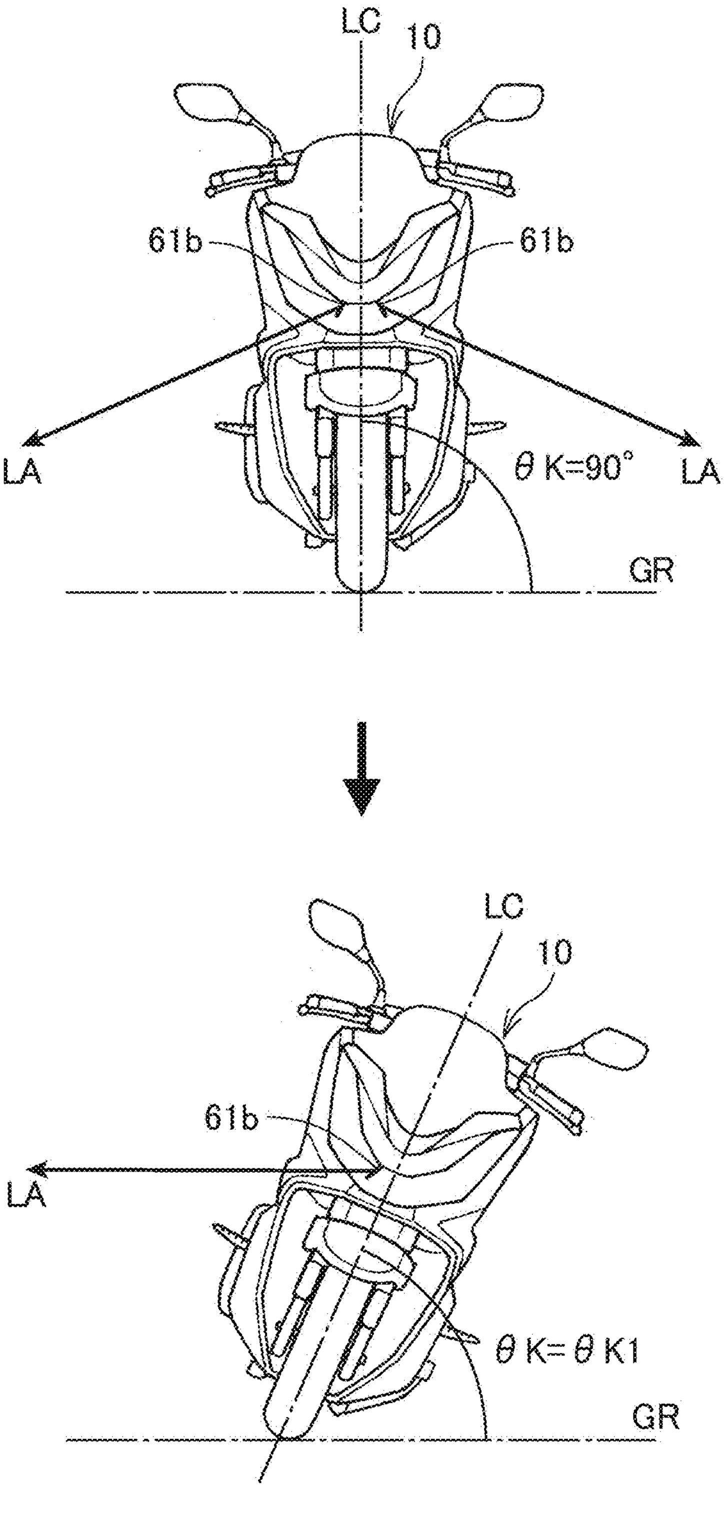
FIG. 3 schematically shows first light emitted downward when the vehicle stands upright, from the front of the vehicle.

FIG. 3 is a view schematically showing the irradiation light LA from the front of the vehicle.

FIG. 3 shows a case where the saddle-ride vehicle 10 is in an upright state and a case where the vehicle is in a tilted state to one of the left and right sides (also referred to as a bank state). The upright state is a state in which the vehicle body stands upright perpendicularly to a traveling surface GR (corresponding to the road or ground), and a tilt angle θK=90° (corresponding to a bank angle=0°) of the vehicle body with respect to the traveling surface GR. As shown in FIG. 3, light beams LA are directed toward the lower left of the vehicle and the lower right of the vehicle, respectively, in the vehicle front view.

The irradiation direction with each light beam LA is set in this manner, and accordingly, as shown in FIG. 3, the tilt angle θK to the left and right of the saddle-ride vehicle 10 is a predetermined angle θK1. Then, the irradiation direction with the irradiation light LA on an outer side that is an opposite side to a tilt direction can be closer to the horizontal direction than the irradiation direction in the upright state. The irradiation light LA is easily directed toward others on the outer side who have to be aware of the saddle-ride vehicle 10 during banking. In addition, a distant place is easily irradiated with the irradiation light LA.

Next, the irradiation light LA and the predetermined angle θK1 of the saddle-ride vehicle 10 will be described in relation to a traveling situation.

Figure 4:
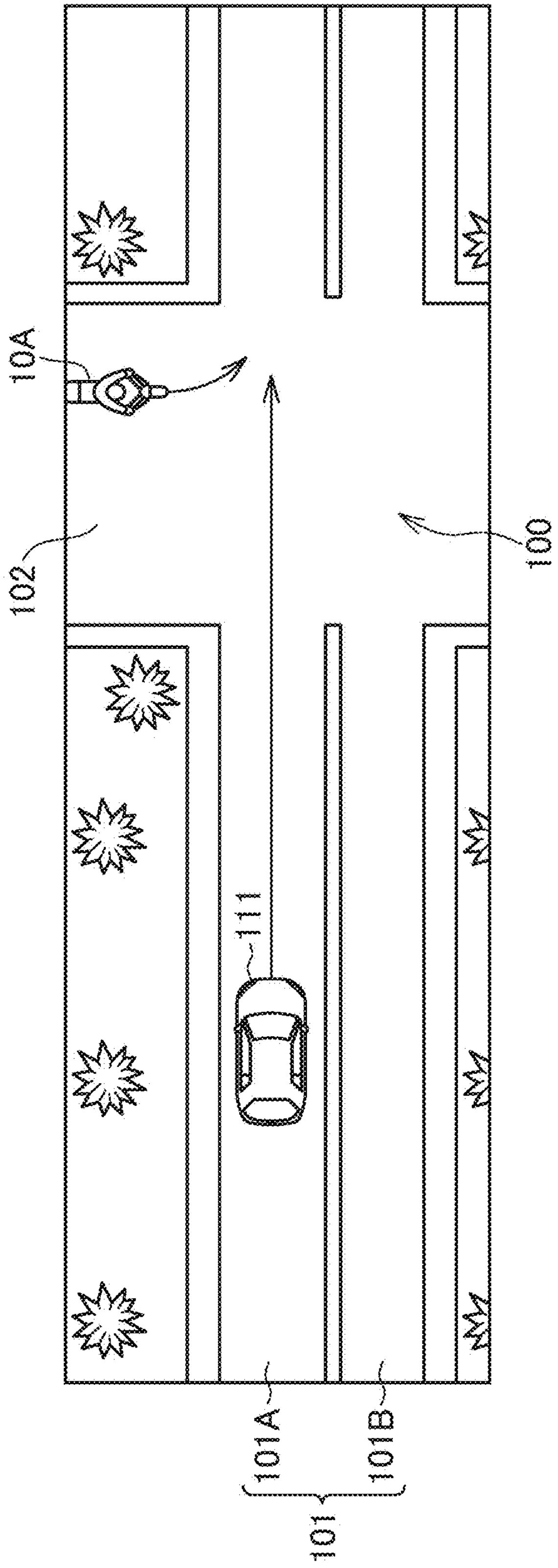
FIG. 4 shows, from above, a traveling situation where a plurality of vehicles travel.

FIG. 4 is a view showing, from above, the traveling situation in which a plurality of vehicles are traveling.

FIG. 4 shows an intersection (also called a crossroad) 100 where two roads intersect, together with surroundings, and a road including a lane 101A where another vehicle 111 (hereinafter referred to as “the other vehicle 111”) travels is referred to as “first road 101”, while a road intersecting the first road 101 is referred to as “second road 102”.

As the saddle-ride vehicle 10 of the present embodiment, a vehicle 10A located at the intersection 100 is illustrated. The vehicle 10A is a vehicle located on the second road 102 and is about to turn left into the lane 101A of the first road 101 (the lane along which the other vehicle 111 travels).

Figure 5:
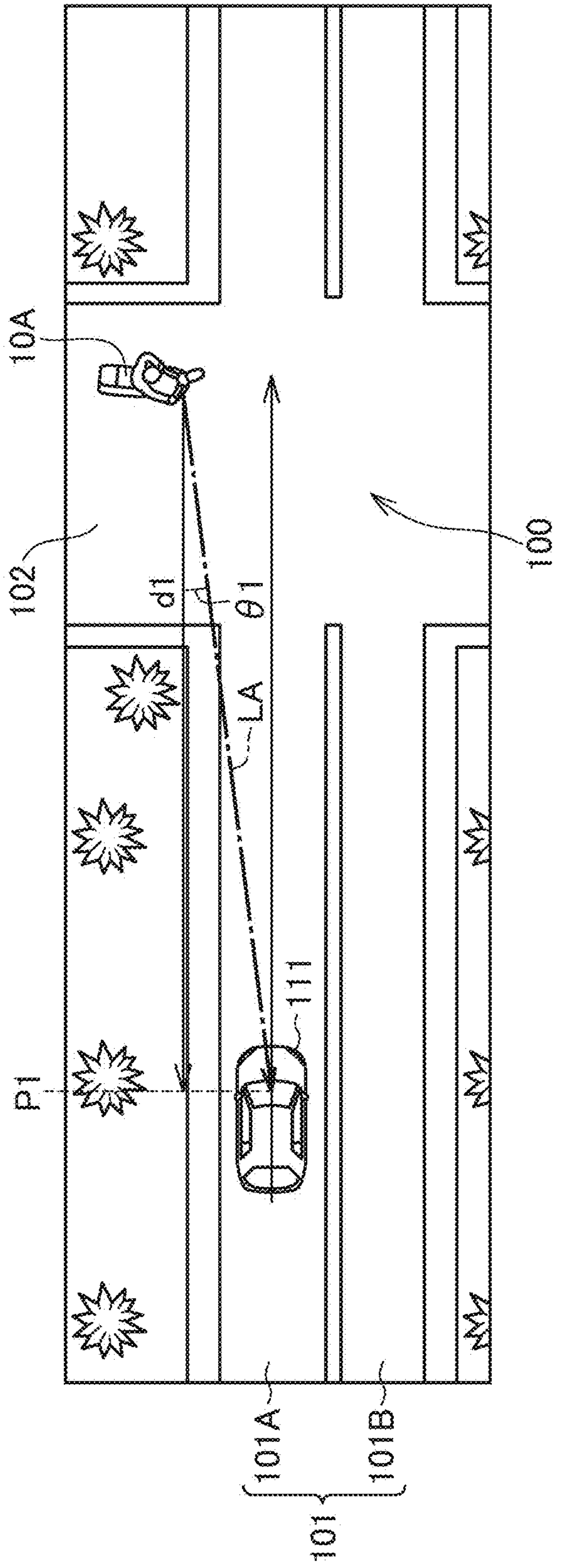
FIG. 5 shows, from above, the saddle-ride vehicle together with the other vehicle.

FIG. 5 is a view showing, from above, the vehicle 10A together with the other vehicle 111. In FIG. 5, in the vehicle 10A immediately before turning left, the handle 21 is steered to a left turn side in a stopped state, and the vehicle 10A is banked on the left side (corresponding to an inner side) by the predetermined angle θK1. To make the description easier to understand, FIG. 5 shows only the light LA on the outer side that is the opposite side to the tilt direction.

The predetermined angle θK1 is appropriately set based on the tilt angle θK of the vehicle 10A that turns on an orthogonal road. As shown in FIG. 5, the vehicle 10A emits the irradiation light LA in a direction of an angle θ1 corresponding to any one of a direction toward the side at the front of the vehicle, a direction toward the side of the vehicle and a direction toward the side at the rear of the vehicle in the top view of the vehicle body. This angle θ1 indicates a direction in which the irradiation light LA is directed toward the driver of the other vehicle 111, when the light unit 41 is a handle mount unit, the other vehicle 111 is located at a position P1, and a steering angle to the left turn side is generated on the handle 21 of the vehicle 10A that is banking. FIG. 2 illustrates that the angle indicates the direction toward the side at the rear of the vehicle with respect to the vehicle 10A.

The irradiation direction with the irradiation light LA is a direction downward on the vehicle when the vehicle stands upright, and toward the side at the rear of the vehicle and accordingly, when the steering angle during the left turn is generated on the handle 21 of the vehicle 10A including the handle mount light unit 41, the irradiation light LA is easily directed toward the driver of the other vehicle 111, with respect to the vehicle 10A.

Depending on the set angle θ1, however, it may be considered that the irradiation direction with the irradiation light LA is set to a downward direction on the vehicle when the vehicle stands upright and either toward the side of the vehicle or toward the side at the front of the vehicle. The position P1 has a separation distance d1 from the vehicle 10A and is set to a position suitable for the other vehicle 111 to avoid contact with the vehicle 10A based on simulations and experiments.

When the light unit 41 is a frame mount unit, the angle θ1 indicates the direction in which the irradiation light LA is directed toward the driver of the other vehicle 111 when the other vehicle 111 is located at the position P1 and sets the irradiation direction with the irradiation light LA to the downward direction on the vehicle when the vehicle stands upright and to the direction toward the side at the front of the vehicle, the direction toward the side of the vehicle or the direction toward the side at the rear of the vehicle.

Here, the other vehicle 111 shown in FIG. 5 is a vehicle traveling on the first road 101 and is a vehicle that may be a vehicle that follows the vehicle 10A after the vehicle 10A turns left.

The position P1 is set, for example, to a position where the other vehicle 111 can avoid the vehicle 10A without contacting the vehicle 10A, or to a position where the other vehicle 111 can stop.

Consequently, in the vehicle top view, the irradiation light LA can be directed toward the driver of the other vehicle 111 at the position P1. In this case, the vehicle 10A is tilted to the left side at the predetermined angle θK1, and accordingly, the irradiation light LA can be emitted closer to a horizontal direction compared to the upright state, so that the irradiation light LA can be emitted at a height at which the light can be easily perceived by the driver of the other vehicle 111.

Therefore, it is possible to allow the driver of the other vehicle 111, which may possibly become the following vehicle, to recognize the irradiation light LA, and in other words, it is possible to allow the driver of the other vehicle 111 to notice the presence of the vehicle 10A. Consequently, the driver of the other vehicle 111 can recognize the vehicle 10A, and visibility of the vehicle 10A is improved.

As shown in FIG. 2, the saddle-ride vehicle 10 includes an information acquiring device 81 and a vehicle controller 82 as a configuration related to the irradiation/irradiation stop with the irradiation light LA. The information acquiring device 81 is a device that detects information on each part of the saddle-ride vehicle 10. The information acquiring device 81 includes at least a vehicle speed detecting unit 81*a* that detects a vehicle speed of the saddle-ride vehicle 10, and at least a tilt angle detecting unit 81*b* that detects the tilt angle θK of the saddle-ride vehicle 10 to the left and right.

The vehicle controller 82 is a device that controls each part of the saddle-ride vehicle 10 and includes an irradiation control unit 82*a* that controls the irradiation/irradiation stop with the irradiation light LA. In addition to a function of controlling the irradiation/irradiation stop with the irradiation light LA based on the information acquired by the information acquiring device 81, the irradiation control unit 82*a* may have functions of controlling the turning on/off of the headlight light, the turning on/off of a turn signal, the tail lamp, and the brake lamp, and the like.

The irradiation control unit 82*a* performs control to drive and light the light source 61*a* only when the vehicle 10A is stopped based on the vehicle speed of the vehicle 10A and to emit the irradiation light LA. Consequently, the irradiation light LA is emitted when the vehicle 10A is stopped. Therefore, as illustrated in FIG. 5, it is possible to allow the vehicle 10A after turning right or left to be easily recognized by the driver of the other vehicle 111, which may possibly become the following vehicle, and it is easy to suppress a situation where the irradiation light LA is emitted when the vehicle 10A is not stopped.

In addition, the light LA on the outer side is emitted to the driver of the other vehicle 111, which may possibly become the following vehicle after the vehicle 10A turns right or left, so that the irradiation control unit 82*a* may emit only the light LA on the outer side that is the opposite side to the tilt direction. For example, the irradiation control unit 82*a* can specify the tilt direction by using the tilt angle θK detected by the tilt angle detecting unit 81*b* and can perform control to emit the light LA on the outer side and not to emit the light LA on the inner side.

Furthermore, the irradiation control unit 82*a* may perform control to emit the irradiation light LA, only when the vehicle 10A is stopped and the tilt angle θK of the vehicle 10A is within a predetermined range. In this case, when the vehicle 10A is stopped and is not in a banked state (corresponding to when the tilt angle θK is outside the predetermined range), the irradiation light LA can be prevented from being emitted.

In addition, although the case where the irradiation light LA is emitted only when the vehicle speed of the vehicle 10A is stopped has been described, control may be performed to emit the irradiation light LA even when the vehicle 10A is in a low-speed state to turn right or left in addition to when the vehicle 10A is stopped. For example, the irradiation control unit 82*a* performs control to emit the irradiation light LA only when the vehicle speed of the vehicle 10A is less than or equal to a predetermined speed. The predetermined speed may be set to substantially include a speed that is less than or equal to the predetermined speed only when the vehicle is stopped, or the predetermined speed may be set to include the speed when the vehicle is in the low-speed state in addition to when the vehicle is stopped. Since the low-speed state for the vehicle to turn right or left is included, the irradiation light LA can be emitted when the vehicle 10A turns right or left while banking, so that an effect of improving the visibility of the vehicle 10A can be expected.

Furthermore, by setting the above predetermined speed to an appropriate speed, it is possible to prevent the irradiation light LA from being emitted while the vehicle is traveling in a high-speed range in which the vehicle will not turn right or left. Therefore, even if an occupant of another vehicle is present at a position irradiated with the irradiation light LA from the vehicle 10A traveling straight in the high-speed range, it is possible to avoid a situation where the occupant is irradiated with the irradiation light LA.

Figure 6:
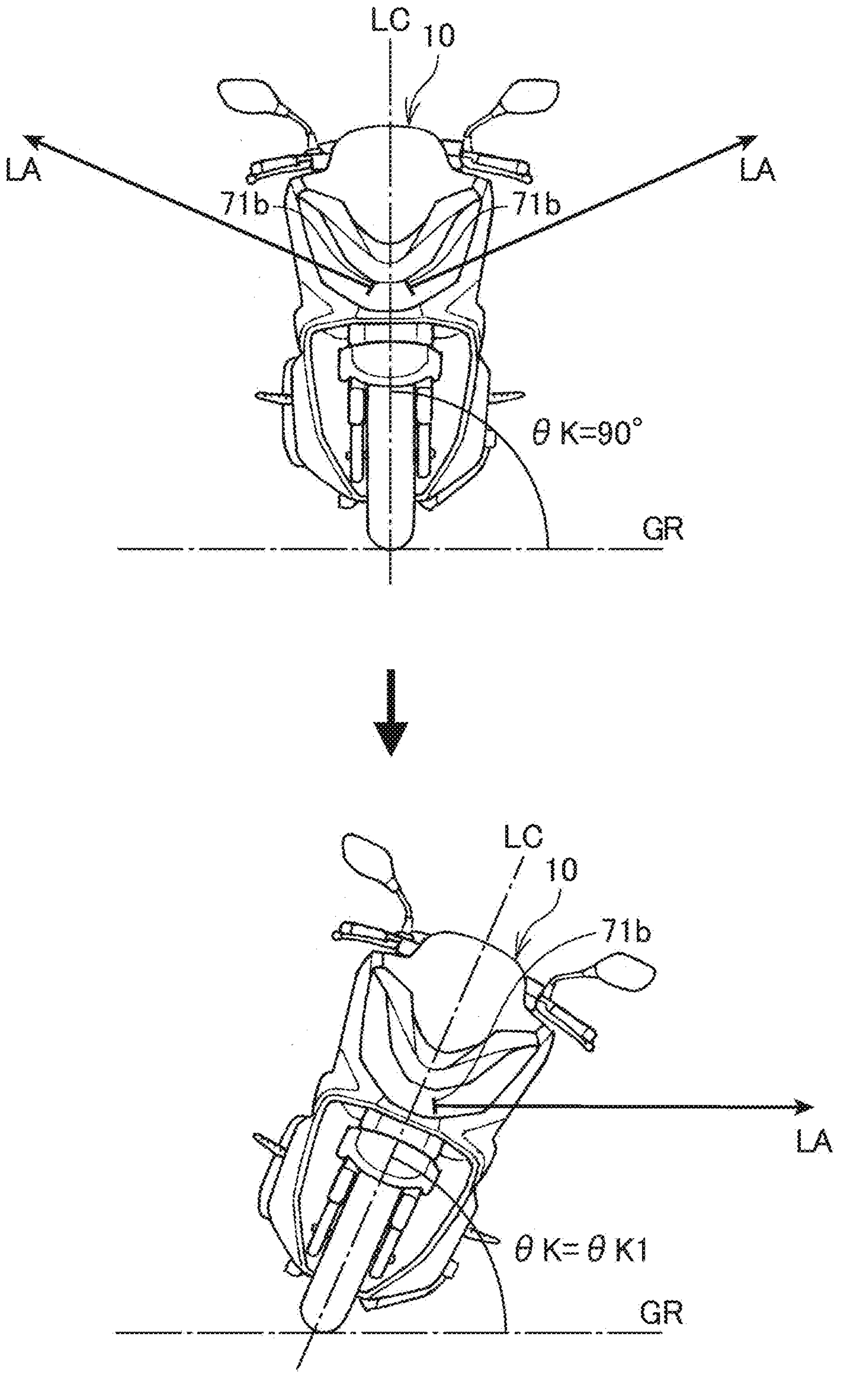
FIG. 6 schematically shows first light emitted upward when the vehicle stands upright, from the front of the vehicle.

When the Irradiation Direction with the Light LA is Upward when the Vehicle Stands Upright FIG. 6 is a view schematically showing the irradiation light LA from the front of the vehicle.

FIG. 6 shows a case where the saddle-ride vehicle 10 is in the upright state and a case where the saddle-ride vehicle 10 is tilted to one of the left and right sides (also referred to as a banked state). As shown in FIG. 6, the light beams LA are directed toward vehicle upper left and vehicle upper right, respectively, in a vehicle front view.

By setting the irradiation direction with each light beam LA in this manner, as shown in FIG. 6, when the tilt angle θK of the saddle-ride vehicle 10 is the predetermined angle θK1, the irradiation direction with the light LA on an inner side in a tilt direction can be set to be more horizontal than the irradiation direction in the upright state. Consequently, the irradiation light LA is easily directed toward another person on the inner side who has to be made aware of the saddle-ride vehicle 10 during banking. As a result, a distant place is easily irradiated with the irradiation light LA.

Figure 7:
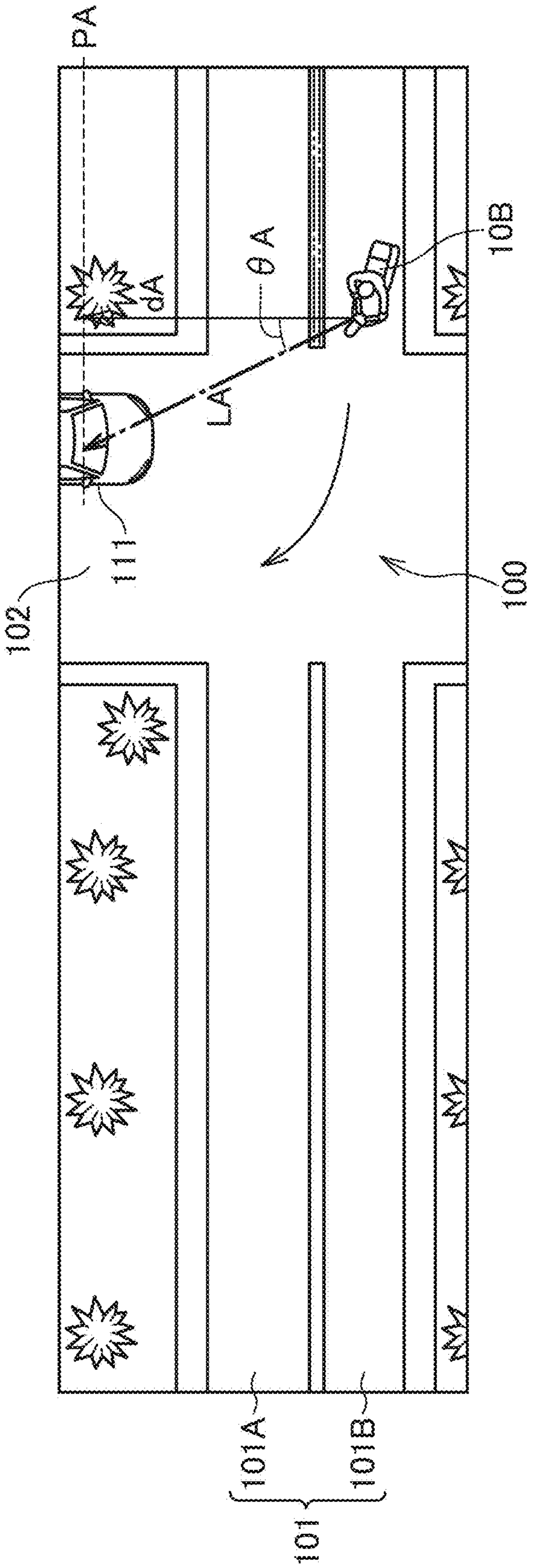
FIG. 7 shows the saddle-ride vehicle together with the other vehicle from above.

FIG. 7 shows a vehicle 10B immediately before turning right at the intersection 100 as the saddle-ride vehicle 10 from above. The vehicle 10B is a vehicle located on the first road 101 (an opposite lane (also called an oncoming road) 101B to the lane 101A) and is about to turn right on the second road 102 that intersects the first road 101. Since the vehicle 10B is immediately before turning right, the handle 21 is steered to the right turn side in a stopped state, and the vehicle 10B is banked on the right side (corresponding to the inner side) at the predetermined angle θK1.

As shown in FIG. 7, the vehicle 10B emits the irradiation light LA in an angle direction corresponding to either a direction toward the side at the front of the vehicle or a direction toward the side of the vehicle as viewed from above the vehicle body. This angle θA indicates a direction in which the driver of the other vehicle 111 recognizes the irradiation light LA, when the light unit 41 is a handle mount unit, the other vehicle 111 is located at a position PA and a steering angle during turning right is generated on the handle 21 of the vehicle 10B. FIG. 7 illustrates that the direction is toward the side at the front of the vehicle with respect to the vehicle 10B.

The irradiation direction with the irradiation light LA is set to the upward direction on the vehicle when the vehicle stands upright and the direction toward the side at the front of the vehicle, and accordingly, the irradiation light LA is easily directed toward the driver of the other vehicle 111 with respect to the vehicle 10A, when the light unit 41 is the handle mount unit and even when the steering angle during turning right or left is generated on the handle 21 of the vehicle 10A.

Depending on the set angle θA, however, it may be considered that the irradiation direction with the irradiation light LA is the upward direction on the vehicle when the vehicle stands upright and the direction toward the side of the vehicle. The position PA has a separation distance dA from the vehicle 10B and is set to a position suitable for the other vehicle 111 to avoid contact with the vehicle 10A based on simulations and experiments. When the light unit 41 is a frame mount unit, the angle θA indicates a direction in which the irradiation light LA is directed toward the driver of the other vehicle 111 when the other vehicle 111 is located at the position PA. For example, the irradiation direction with the irradiation light LA is set to the upward direction on the vehicle when the vehicle stands upright and either the direction toward the side at the front of the vehicle or the direction toward the side of the vehicle.

Here, the other vehicle 111 shown in FIG. 7 is a vehicle traveling on the second road 102 to which the vehicle 10B turns right, and this other vehicle may possibly become an oncoming vehicle to the vehicle 10B after the vehicle 10B turns right.

The position PA is set to, for example, a position where the other vehicle 111 can avoid the vehicle 10B without contacting the vehicle 10B, or a position where the other vehicle 111 can be stopped. Consequently, the irradiation light LA can be directed toward the driver of the other vehicle 111 at the position PA in the vehicle top view. Furthermore, since the vehicle 10B is tilted to the right side at the predetermined angle θK1, the irradiation light LA can be emitted close to the horizontal direction, and the driver of the other vehicle 111 can be irradiated with the irradiation light LA at a height where the light is easily perceived by the driver.

Therefore, the driver of the other vehicle 111 that may possibly become the oncoming vehicle can recognize the irradiation light LA and notice the vehicle 10B, and the visibility of the vehicle 10B is improved. To make the description easier to understand, FIG. 7 shows only the light LA on the inner side in the tilt direction.

As described above, the irradiation control unit 82*a* performs control to emit the irradiation light LA only when the vehicle 10B is stopped, so that the irradiation light LA is emitted when the vehicle 10B is stopped. Therefore, as illustrated in FIG. 7, it is easy to allow the vehicle 10B to be recognized by the driver of the other vehicle 111, which may possibly become the oncoming vehicle after the vehicle turns right or left, and it is easy to suppress the situation where the irradiation light LA is emitted when the vehicle 10B is not stopped.

In addition, since the driver of the other vehicle 111 which may possibly become the oncoming vehicle after the vehicle 10B turns right or left is irradiated with the light LA on the inner side, the driver may be irradiated only with the light LA on the inner side in the tilt direction by the irradiation control unit 82*a*. For example, the irradiation control unit 82*a* specifies the tilt direction by using the tilt angle θK detected by the tilt angle detecting unit 81*b* and can perform control to emit the light LA on the inner side, and not to emit the light LA on the outer side.

Furthermore, the vehicle 10B may be a vehicle immediately before a U-turn or may be about to make a U-turn. In this case, when the vehicle 10B is in a banked state immediately before the U-turn, the driver of the other vehicle 111 traveling on the orthogonal second road 102 can recognize the vehicle 10B.

Furthermore, the irradiation control unit 82*a* performs control to emit the irradiation light LA only when the vehicle speed of the vehicle 10B is less than or equal to a predetermined speed and the tilt angle θK of the vehicle 10B is within a predetermined range, so that the irradiation light LA can be prevented from being emitted, when the vehicle 10B is stopped and is not banked.

In addition, the vehicle speed of the vehicle 10B that is less than or equal to the predetermined speed is not limited to a case where the vehicle 10B is stopped and may be set to include a low-speed state when the vehicle 10B turns right or left (including a U-turn). Consequently, it is possible to emit the irradiation light LA while the vehicle 10B turns right or left or makes a U-turn at a low speed while banking, and the effect of improving the visibility of the vehicle 10B can be expected.

Furthermore, the irradiation control unit 82*a* may perform control to emit the irradiation light LA, only when the vehicle 10B is stopped and the tilt angle θK of the vehicle 10B is within a predetermined range. In this case, when the vehicle 10B is stopped and is not in a banked state (corresponding to when the tilt angle θK is outside the predetermined range), the irradiation light LA cannot be emitted.

Furthermore, when the vehicle 10B is in the low-speed state to turn right or left, control may be performed to emit the irradiation light LA. For example, the irradiation control unit 82*a* performs control to emit the irradiation with the irradiation light LA only when the vehicle speed of the vehicle 10B is less than or equal to a predetermined speed, and the predetermined speed may be set to include the speed less than or equal to the predetermined speed substantially only when the vehicle 10B is stopped. Alternatively, the predetermined speed may be set to include the predetermined speed when the vehicle 10B is in the low-speed state in addition to when the vehicle 10B is stopped. The predetermined speed includes the low-speed state when the vehicle 10B turns right or left, and it is accordingly possible to emit the irradiation light LA when the vehicle 10B turns right or left while banking, so that the effect of improving the visibility of the vehicle 10B can be expected.

Furthermore, by setting the above predetermined speed to an appropriate speed, the irradiation light LA can be prevented from being emitted during traveling in a high-speed range in which the vehicle does not make a right or left turn (including a U-turn). Therefore, even if an occupant of another vehicle is present at a position irradiated with the irradiation light LA from the vehicle 10B traveling straight in a high-speed range, it is possible to avoid a situation where the occupant is irradiated with the irradiation light LA.

As described above, the light unit 41 constituting the lighting device emits the irradiation light LA capable of providing a higher brightness than the headlight light and taillight light at the predetermined position spaced away from the saddle-ride vehicle 10. The irradiation direction with the irradiation light LA is any one of the direction toward the side at the front of the vehicle, the direction toward the side at the rear of the vehicle, and the direction toward the side of the vehicle, and the upward direction or the downward direction when the vehicle stands upright. Consequently, when an own vehicle that is the saddle-ride vehicle 10 is tilted to the left or right, due to the tilt, the irradiation direction with the irradiation light LA is closer to the horizontal direction than the irradiation direction when the vehicle stands upright, so that the irradiation light LA is easily directed toward the other vehicle 111 or a pedestrian located at a place irradiated with the irradiation light LA. This allows others outside the own vehicle to easily recognize the own vehicle when the own vehicle is tilted to the left or right.

Furthermore, by setting the irradiation direction with the irradiation light LA to be downward on the vehicle when the vehicle stands upright and toward the side at the rear of the vehicle, it is possible to easily direct the irradiation light LA toward the driver of the other vehicle 111 that may possibly become the following vehicle after turning right or left with respect to the own vehicle, when the steering angle during turning right or left is generated on the handle 21 of the own vehicle that is the saddle-ride vehicle 10 including the light unit 41 that is the handle mount unit. In other words, when the steering angle during turning right or left is generated on the handle 21 of the saddle-ride vehicle 10 and the saddle-ride vehicle 10 is tilted to one of the left and right sides, the irradiation light LA is easily directed toward the driver of the other vehicle 111, the pedestrian or the like located on or around the opposite side to the tilt direction.

Furthermore, by setting the irradiation direction with the irradiation light LA to a direction upward on the vehicle when the vehicle stands upright and toward the side at the front of the vehicle, the irradiation light LA is easily directed toward the driver of the other vehicle 111 that may possibly become the oncoming vehicle after turning right or left with respect to the own vehicle, when the steering angle during turning right or left is generated on the handle 21 of the own vehicle that is the saddle-ride vehicle 10 including the light unit 41 that is a handle mount unit. In other words, when the steering angle during turning right or left is generated on the handle 21 of the saddle-ride vehicle 10 and the saddle-ride vehicle 10 is tilted to one of the left and right sides, the irradiation light LA is easily directed toward the driver of the other vehicle 111 or the pedestrian located in or around the tilt direction.

Furthermore, the saddle-ride vehicle 10 includes the vehicle speed detecting unit 81*a* that detects the vehicle speed, and the irradiation light LA is emitted only when the vehicle speed is less than or equal to the predetermined speed. According to this configuration, the irradiation light LA can be emitted during stopping or turning right or left, and the irradiation light LA can be prevented from being emitted during traveling at a speed higher than the predetermined speed.

In addition, the irradiation direction with the irradiation light LA is set to the direction toward the side at the front of the vehicle, and the brightness of the irradiation light LA is higher than that of the headlight light and the turn signal light at a predetermined position spaced away from the saddle-ride vehicle 10 in the irradiation direction with the irradiation light LA. According to this configuration, on the side at the front of the vehicle, when the own vehicle that is the saddle-ride vehicle 10 is tilted to the left or right, due to the tilt, the irradiation direction with the irradiation light LA is closer to the horizontal direction than the irradiation direction when the vehicle stands upright, so that predetermined light is easily directed toward the other vehicle or the pedestrian around the own vehicle. This allows others outside the own vehicle to easily recognize the own vehicle when the own vehicle is tilted to the left or right.

Other Embodiments

The saddle-ride vehicle 10 according to another embodiment includes the same configuration as in the above embodiment except that the rear light unit 45 has a function of emitting irradiation light LA. Hereinafter, parts different from the above embodiment will be described, and the same configuration as in the above embodiment is denoted with the same reference numerals. The redundant description of the above embodiment will be omitted as appropriate.

Figure 8:
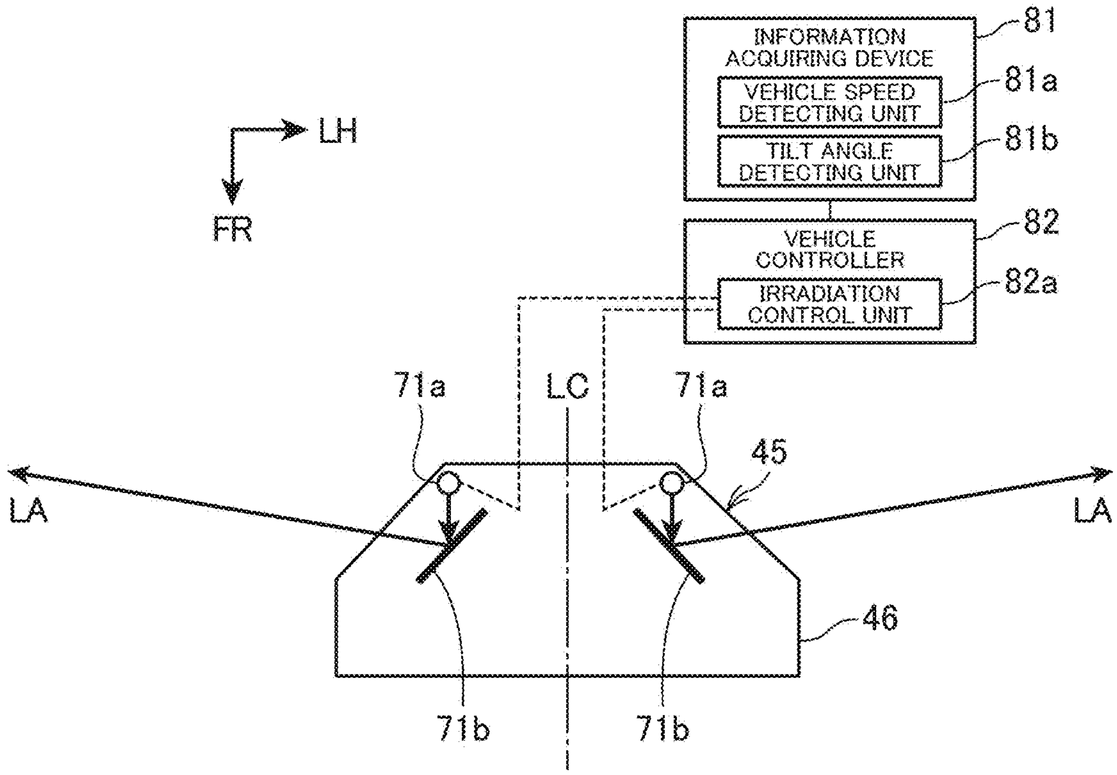
FIG. 8 schematically shows, from above the vehicle body, a rear light unit of another embodiment.

FIG. 8 is a view schematically showing the rear light unit 45 from above the vehicle.

The rear light unit 45 includes a housing 46 (also referred to as an enclosure) extending outward to the left and right with respect to a vehicle width center LC, and includes, in the housing 46, a pair of left and right light sources 71*a*, and a pair of left and right reflectors 71*b* that reflect light from each light source 71*a* as irradiation light LA.

Each light source 71*a* is a known light source such as an LED and emits visible light.

Each reflector 71*b* is formed in a reflecting mirror that emits light from the light source 71*a* in an irradiation direction with the irradiation light LA. Each reflector 71*b* forms the irradiation light LA into parallel light or quasi-parallel light having a small divergence angle, and the light can provide a higher brightness than headlight light, taillight light, or turn signal light that is diffusion light at a predetermined position spaced away from the saddle-ride vehicle 10.

Each reflector 71*b* and light source 71*a* are fixed to the rear light unit 45. Therefore, the irradiation direction with each irradiation light LA from the saddle-ride vehicle 10 is fixed. In the present configuration, as shown in FIG. 8, each reflector 71*b* emits the irradiation light LA to the side of the vehicle (including the side at the front of the vehicle and the side at the rear of the vehicle) in the top view of the vehicle. In the other embodiment as well, as viewed in a front-rear direction of a vehicle body, the irradiation direction with the irradiation light LA may be a downward direction when the vehicle stands upright or an upward direction when the vehicle stands upright, and each case will be described.

Figure 9:
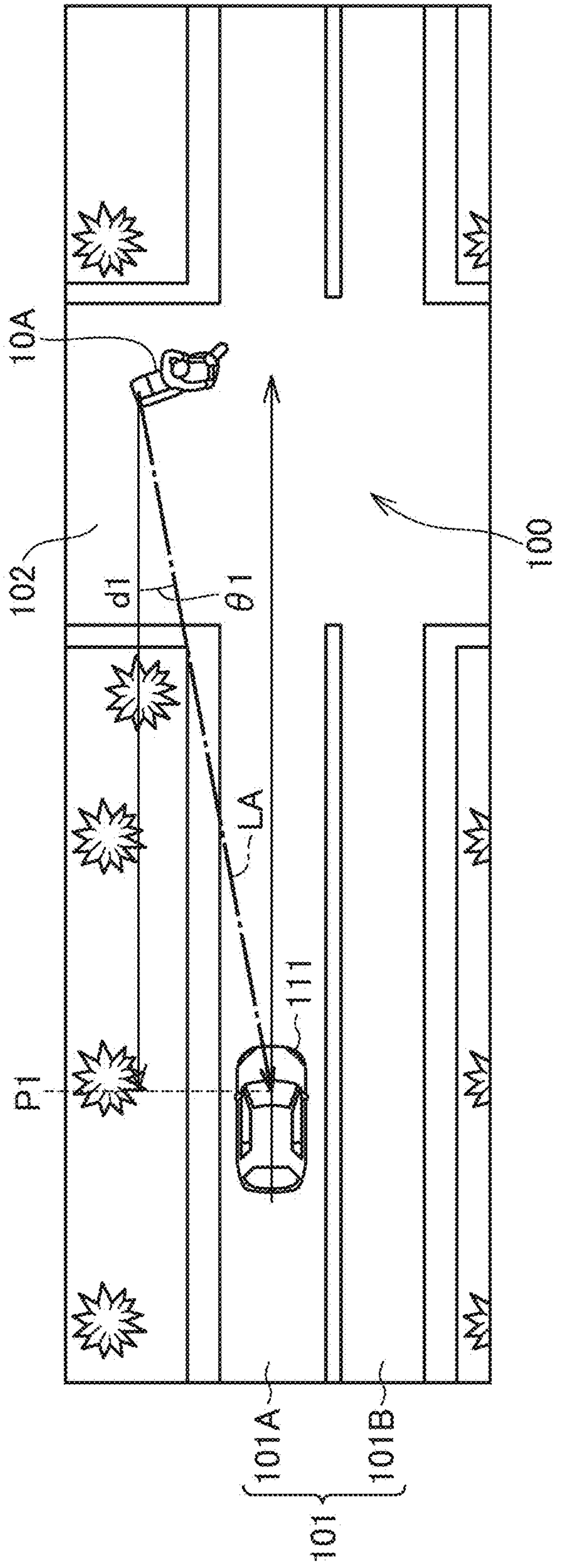
FIG. 9 shows a saddle-ride vehicle according to still another embodiment together with the other vehicle from above.

Case where the Irradiation Direction with the Light LA is Downward when the Vehicle Stands Upright FIG. 9 shows the vehicle 10A located at the intersection 100 as the saddle-ride vehicle 10 together with the other vehicle 111 from above. In FIG. 9, in the vehicle 10A immediately before turning left, the handle 21 is steered to the left turn side in a stopped state, and the vehicle 10A is banked on the left side (corresponding to the inner side) by a predetermined angle θK1.

As shown in FIG. 9, in the top view of the vehicle, the vehicle 10A emits the irradiation light LA in a direction of an angle θ1 corresponding to any one of the direction toward the side at the front of the vehicle, the direction toward the side of the vehicle, and the direction toward the side at the rear of the vehicle. This angle θ1 indicates a direction in which the driver of the other vehicle 111 recognizes the irradiation light LA when the other vehicle 111 is at the position P1 on the lane 101A, and FIG. 8 illustrates the direction toward the side at the rear of the vehicle with respect to the vehicle 10A. Depending on the set angle θ1, it is considered that the irradiation direction with the irradiation light LA is either the direction toward the side at the front the vehicle or the direction toward the side of the vehicle. The position P1 has a distance from the vehicle 10A as a separation distance d1 and is set to a position suitable for the other vehicle 111 to avoid contact with the vehicle 10A based on simulations and experiments.

Consequently, in a configuration in which the rear light unit 45 emits the irradiation light LA downward when the vehicle stands upright, as viewed from above the vehicle, the irradiation light LA can be directed toward the driver of the other vehicle 111 located at the position P1, which may possibly become the following vehicle. In this case, since the vehicle 10A is tilted to the left at the predetermined angle θK1, the irradiation light LA on the right side, which is on an outer side, can be emitted closer to the horizontal direction compared to the upright state, so that the irradiation light LA can be emitted at a height that is easily perceived by the driver of the other vehicle 111.

Therefore, the irradiation light LA can be directed toward the driver of the other vehicle 111 that may possibly become the following vehicle in such a manner that the driver recognizes the irradiation light LA, and the vehicle 10A is easily noticed. This improves the visibility of the vehicle 10A.

Since the irradiation light LA is light directed rearward in the left and right directions L and R of the vehicle body (see FIG. 8), the light LA is not blocked by the occupant of the vehicle 10A. This also improves the visibility of the vehicle 10A. To make the description easier to understand, FIG. 9 only shows the light LA on the outer side, which is on the opposite side to the tilt direction.

The irradiation control unit 82*a* performs control to drive and light the light source 71*a* and to emit the irradiation light LA only when the vehicle 10A is stopped based on the vehicle speed of the vehicle 10A in the same manner as in the above embodiment. This allows the vehicle 10A after turning right or left to be easily recognized by the driver of the other vehicle 111, which may possibly become the following vehicle. It is easier to suppress the situation where the irradiation light LA is emitted when the vehicle 10A is not stopped.

Figure 10:
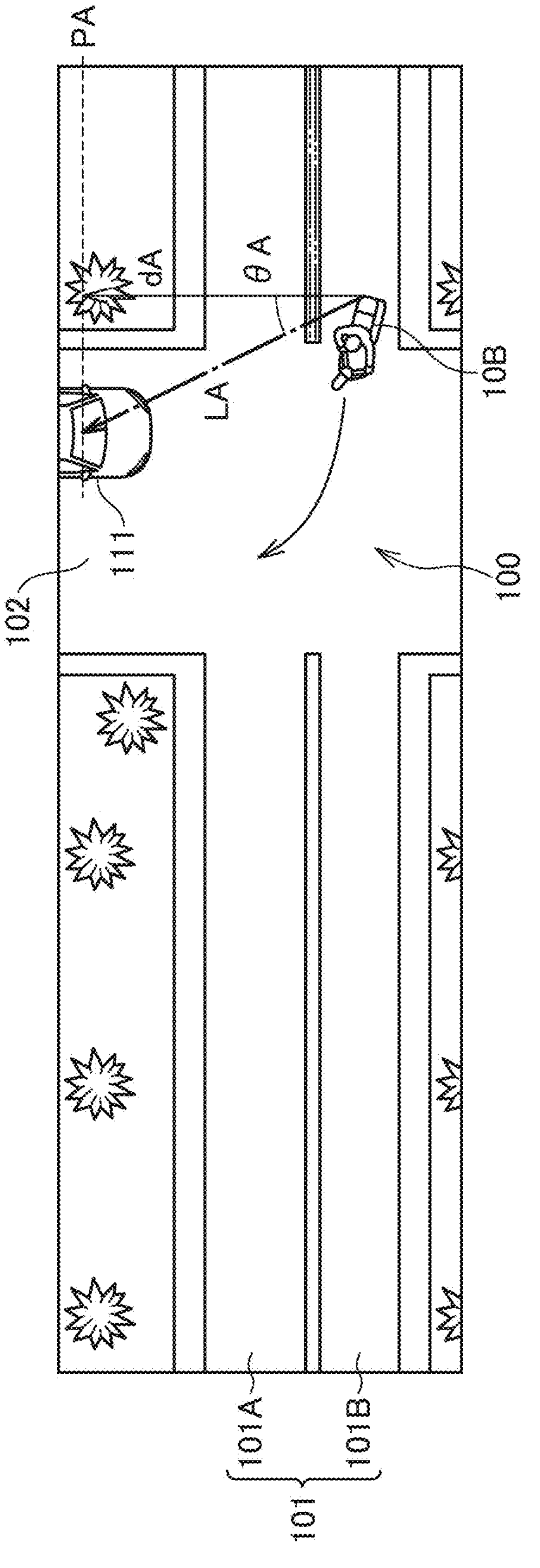
FIG. 10 shows a saddle-ride vehicle according to a further embodiment together with the other vehicle from above.

Case where the Irradiation Direction with the Light LA is Upward when the Vehicle Stands Upright FIG. 10 shows, from above, the vehicle 10B immediately before a right turn or a U-turn at the intersection 100 as the saddle-ride vehicle 10. Since the vehicle 10B is immediately before the right turn or immediately before the U-turn, the handle 21 is steered to the right turn side in a stopped state, and the vehicle 10B is banked on the right side (corresponding to the inner side) at the predetermined angle θK1.

As shown in FIG. 10, in the top view of the vehicle body, the vehicle 10B emits the irradiation light LA in a direction at an angle θA corresponding to any one of the direction toward the side at the front of the vehicle and the direction toward the side of the vehicle. This angle θA indicates a direction that allows the driver of the other vehicle 111 to recognize the irradiation light LA, when the other vehicle 111 is located at a position PA on the second road 102, which may possibly become an oncoming vehicle after the vehicle 10B turns right. FIG. 10 illustrates a case where the direction is toward the side at the front of the vehicle with respect to the vehicle 10B. Depending on the set angle θA, it is considered that the irradiation direction with the irradiation light LA is toward the side of the vehicle. The position PA is at a separation distance dA that is the distance from the vehicle 10B and is set to a position suitable for the other vehicle 111 to avoid contact with the vehicle 10B based on simulations and experiments.

As a result, in a configuration in which the irradiation light LA is emitted upward from the rear light unit 45 when the vehicle stands upright, as viewed from above the vehicle, the irradiation light LA can be directed toward the driver of the other vehicle 111, which is located at the position PA and may possibly become the oncoming vehicle. In this case, the vehicle 10B is tilted to the left at the predetermined angle θK1, and accordingly, the irradiation light LA on the left side, which is on the inner side, can be emitted closer to the horizontal direction compared to the upright state, so that the irradiation light LA can be emitted at a height that is easily perceived by the driver of the other vehicle 111.

Therefore, the irradiation light LA can be directed toward the driver of the other vehicle 111 that may possibly become the oncoming vehicle, and the driver can recognize the irradiation light LA, so that the vehicle 10B is easily noticed. This improves the visibility of the vehicle 10B.

In this case as well, the irradiation control unit 82*a* performs control to drive and light the light source 71*a* only when the vehicle 10B is stopped based on the vehicle speed of the vehicle 10B and to emit the irradiation light LA in the same manner as in the above embodiment. This allows the vehicle 10B after turning right or left to be easily recognized by the driver of the other vehicle 111 that may possibly become the oncoming vehicle, and it is easier to suppress the situation where the irradiation light LA is emitted when the vehicle 10B is not stopped.

Thus, the rear light unit 45 constituting the lighting device emits the irradiation light LA capable of providing a higher brightness than the headlight light or taillight light at a predetermined position spaced away from the saddle-ride vehicle 10. The irradiation direction with the irradiation light LA is any one of the direction toward the side at the front of the vehicle, the direction toward the side at the rear of the vehicle, and the direction toward the side of the vehicle and either the upward direction or the downward direction when the vehicle stands upright. Consequently, when the own vehicle that is the saddle-ride vehicle 10 is tilted to the left or right, due to the tilt, the irradiation direction with the irradiation light LA is closer to the horizontal direction than the irradiation direction when the vehicle stands upright. The irradiation light LA is easily directed toward the other vehicle 111 or the pedestrian located at a place irradiated with the irradiation light LA. As a result, various effects like those of the above embodiment can be obtained, such as an effect of allowing others outside the own vehicle to easily recognize the own vehicle when the own vehicle is tilted to the left or right.

Furthermore, the irradiation direction with the irradiation light LA is set to the direction toward the side at the rear of the vehicle, and the brightness of the irradiation light LA is higher than the taillight light and the turn signal light at a predetermined position spaced away from the saddle-ride vehicle 10 in the irradiation direction with the irradiation light LA. According to this configuration, on the side at the rear of the vehicle, when the own vehicle that is the saddle-ride vehicle 10 is tilted to the left or right, due to the tilt, the irradiation direction with the irradiation light LA is closer to the horizontal direction than the irradiation direction when the vehicle stands upright. The predetermined light is easily directed toward the other vehicle or pedestrian around the own vehicle. This allows others outside the own vehicle to easily recognize the own vehicle when the own vehicle is tilted to the left or right.

Each of the above-described embodiments is merely an illustration of one aspect of the present invention and can be arbitrarily modified and applied to such an extent that does not deviate from the gist of the present invention.

For example, in each of the above-described embodiments, it has been described that the irradiation direction with the irradiation light LA is any one of the direction toward the side at the front of the vehicle, the direction toward the side of the vehicle, and the direction toward the side at the rear of the vehicle, and either the upward direction or the downward direction when the vehicle stands upright, and the embodiments are not limited thereto. In the present invention, the irradiation direction with the irradiation light LA is any one of the direction toward the side at the front of the vehicle, the direction toward the side at the rear of the vehicle, and the direction toward the side of the vehicle, and either the upward direction or the downward direction when the vehicle stands upright, so that the saddle-ride vehicle 10 is easily recognized by the other vehicle or pedestrian located in at least one of the direction toward the side at the front of the vehicle, the direction toward the side at the rear of the vehicle, and the direction toward the side of the vehicle from the saddle-ride vehicle 10.

Furthermore, in each of the above-described embodiments, the vehicle controller 82 may perform control to vary the direction of the irradiation light LA depending on the tilt angle θK detected by the tilt angle detecting unit 81*b*. In this case, for example, the vehicle includes a movable mechanism by which each reflector 61*b*, 71*b* is movable, and the vehicle controller 82 controls the movable mechanism and varies the direction of the irradiation light LA so that the irradiation light LA is horizontal depending on the tilt angle θK. According to this configuration, the irradiation direction with the irradiation light LA is easily changed to a direction in which the own vehicle is more easily noticed by others outside the own vehicle depending on the tilt angle of the own vehicle that is the saddle-ride vehicle 10 to the left or right. However, the irradiation direction with the irradiation light LA is not limited to the horizontal direction and may only be a direction in which the own vehicle that is the saddle-ride vehicle 10 can be easily recognized by others outside the own vehicle. Furthermore, the vehicle controller 82 may variably control the direction of the irradiation light LA in a front-rear direction depending on the tilt angle θK, to change the irradiation direction with the irradiation light LA to the direction in which the own vehicle can be easily recognized by the others outside the own vehicle.

Furthermore, the configuration for irradiation with a pair of left and right irradiation light beams LA is not limited to the configuration of each of the above-described embodiments, and the number and direction of irradiation light beams LA may be changed.

In addition, the saddle-ride vehicle to which the present invention is applicable is not limited to the motorcycle shown in FIG. 1, and the present invention is applicable to any saddle-ride vehicle including a vehicle body that is tilted to the left or right. Furthermore, an irradiation direction with light is an optical axis direction.

Configurations Supported by the Above Embodiments

The above embodiments support the following configurations.

(Configuration 1) A saddle-ride vehicle comprising: a lighting device, wherein the lighting device emits predetermined light capable of providing a higher brightness than headlight light and taillight light at a predetermined position spaced away from the vehicle, and an irradiation direction with the predetermined light is at least one of a direction toward the side at the front of the vehicle, a direction toward the side at the rear of the vehicle, and a direction toward the side of the vehicle, and at least one of an upward direction and a downward direction when the vehicle stands upright.

According to this configuration, when an own vehicle that is the saddle-ride vehicle is tilted to the left or right, due to the tilt, the irradiation direction with the predetermined light is closer to the horizontal direction than the irradiation direction when the vehicle stands upright, and the predetermined light is easily directed toward another vehicle or pedestrian around the own vehicle. This allows others outside the own vehicle to easily recognize the own vehicle when the own vehicle is tilted to the left or right.

(Configuration 2) The saddle-ride vehicle according to Configuration 1, wherein the irradiation direction with the predetermined light is a direction downward on the vehicle when the vehicle stands upright, and toward the side at the rear of the vehicle.

According to this configuration, when an steering angle during the right or left turn is generated on the handle of the own vehicle that is the saddle-ride vehicle including the handle mount lighting device, the irradiation light is easily directed toward the driver of the other vehicle that may possibly become the following vehicle after turning right or left with respect to the own vehicle.

(Configuration 3) The saddle-ride vehicle according to Configuration 1 or 2, wherein the irradiation direction with the predetermined light is a direction upward on the vehicle when the vehicle stands upright, and toward at least one of the side at the front of the vehicle and the side of the vehicle.

According to this configuration, when the steering angle during the right or left turn is generated on the handle of the own vehicle that is the saddle-ride vehicle including the handle mount lighting device, the irradiation light is easily directed toward the driver of the other vehicle or the like that may possibly become an oncoming vehicle after turning right or left with respect to the own vehicle.

(Configuration 4) The saddle-ride vehicle according to any one of Configurations 1 to 3, further comprising: a vehicle speed detecting unit that detects a vehicle speed, wherein the predetermined light is emitted only when the vehicle speed is less than or equal to a predetermined speed.

This configuration makes it possible to emit the predetermined light when the vehicle is stopped or turns right or left and to prevent the predetermined light from being emitted when the vehicle travels at a speed higher than the predetermined speed.

(Configuration 5) The saddle-ride vehicle according to any one of Configurations 1 to 4, further comprising: a tilt angle detecting unit that detects a tilt angle of the saddle-ride vehicle to the left or right, and a controller that varies the direction of the predetermined light depending on the tilt angle.

According to this configuration, the irradiation direction with the predetermined light is easily changed to a direction in which others outside the own vehicle more easily notices the predetermined light, depending on the tilt angle of the own vehicle that is the saddle-ride vehicle to the left or right.

(Configuration 6) The saddle-ride vehicle according to Configuration 1, wherein the irradiation direction with the predetermined light is toward the side at the front of the vehicle, and the predetermined light provides a higher brightness than headlight light and turn signal light at a predetermined position spaced away from the vehicle in the irradiation direction with the predetermined light.

According to this configuration, on the side at the front of the vehicle, when the own vehicle that is the saddle-ride vehicle is tilted to the left or right, due to the tilt, the irradiation direction with the predetermined light is closer to a horizontal direction than the irradiation direction when the vehicle stands upright, and the predetermined light is easily directed toward the other vehicles or pedestrians around the own vehicle. This allows others outside the own vehicle to easily recognize the own vehicle when the own vehicle is tilted to the left or right.

(Configuration 7) The saddle-ride vehicle according to Configuration 1, wherein the irradiation direction with the predetermined light is toward the side at the rear of the vehicle, and the predetermined light provides a higher brightness than taillight light and turn signal light at a predetermined position spaced away from the vehicle in the irradiation direction with the predetermined light.

According to this configuration, on the side at the rear of the vehicle, when the own vehicle that is the saddle-ride vehicle is tilted to the left or right, due to the tilt, the irradiation direction with the predetermined light is closer to the horizontal direction than the irradiation direction when the vehicle stands upright, and the predetermined light is easily directed toward the other vehicles or pedestrians around the own vehicle. This allows others outside the own vehicle to easily recognize the own vehicle when the own vehicle is tilted to the left or right.

REFERENCE SIGNS LIST

10 saddle-ride vehicle
10A, 10B vehicle (saddle-ride vehicle)

11 vehicle body frame
21 handle
21*a* handlebar
41 light unit (lighting device)
45 rear light unit (lighting device)
61*a* light source
61*b*, 71*b* reflector
81 information acquiring device
81*a* vehicle speed detecting unit
81*b* tilt angle detecting unit
82 vehicle controller (controller)
82*a* irradiation control unit
111 other vehicle
LA irradiation light (predetermined light)
LC vehicle width center

The invention claimed is:

1. A saddle-ride vehicle comprising: a lighting device, wherein the lighting device emits predetermined light capable of providing a higher brightness than headlight light and taillight light at a predetermined position spaced away from the vehicle, and an irradiation direction with the predetermined light is at least one of a direction toward the side at the front of the vehicle, a direction toward the side at the rear of the vehicle, and a direction toward the side of the vehicle, and at least one of an upward direction and a downward direction when the vehicle stands upright, the saddle-ride vehicle further comprising:

a vehicle speed detecting unit that detects a vehicle speed, a tilt angle detecting unit that detects a tilt angle of the saddle-ride vehicle to the left or right, and a controller that varies the direction of the predetermined light depending on the tilt angle, wherein the controller performs control to irradiate an outer side that is an opposite side to a tilt direction with the predetermined light in a direction in which direct light of the predetermined light reaches the outer side and others outside the vehicle, when the vehicle is stopped and banked to the left or right, and not to irradiate the outer side with the predetermined light when the vehicle is stopped and is not banked to the left or right.

2. The saddle-ride vehicle according to claim 1, wherein the irradiation direction with the predetermined light is a direction downward on the vehicle when the vehicle stands upright, and toward the side at the rear of the vehicle.

3. The saddle-ride vehicle according to claim 1, wherein the controller performs control not to irradiate an inner side in a tilt direction with the predetermined light, when the vehicle is stopped and banked to the left or right.

4. The saddle-ride vehicle according to claim 1, wherein the predetermined light is emitted only when the vehicle speed is less than or equal to a predetermined speed.

5. The saddle-ride vehicle according to claim 1, wherein the irradiation direction with the predetermined light is toward the side at the front of the vehicle, and the predetermined light provides a higher brightness than headlight light and turn signal light at a predetermined position spaced away from the vehicle in the irradiation direction with the predetermined light.

6. The saddle-ride vehicle according to claim 1, wherein the irradiation direction with the predetermined light is toward the side at the rear of the vehicle, and the predetermined light provides a higher brightness than taillight light and turn signal light at a predetermined position spaced away from the vehicle in the irradiation direction with the predetermined light.

7. The saddle-ride vehicle according to claim 2, wherein the predetermined light is emitted only when the vehicle speed is less than or equal to a predetermined speed.

8. The saddle-ride vehicle according to claim 3, wherein the predetermined light is emitted only when the vehicle speed is less than or equal to a predetermined speed.

* * * * *